United States Patent Office 2,864,829
Patented Dec. 16, 1958

2,864,829

STEROL DEHYDROHALOGENATION PROCESS

Howard C. Klein, Brooklyn, N. Y., and Roland Kapp, Newark, N. J., assignors to Nopco Chemical Company, Harrison, N. J., a corporation of New Jersey No Drawing. Application May 10, 1954
Serial No. 428,793

12 Claims. (Cl. 260—397.2)

This invention relates to an improved process for producing 7-dehydrosterols and more particularly to an improved process for the dehydrohalogenation of halogenated sterol compounds.

Since the discovery by Ziegler (Annalen 551, 80–119) that the halogenation of organic compounds at a carbon atom alpha to a double bond could be accomplished by using compounds such as N-halogenated acid amides and imides as halogenating agents, a great deal of research has been carried out on the application of this reaction to the production of 7-dehydro derivatives of various sterol compounds. The greater part of this work has been directed to the production of 7-dehydrochloresterol. As is well known, 7-dehydrocholesterol is readily converted to vitamin $D_3$ by irradiation with ultra-violet light. In order to form 7-dehydrocholesterol from the halogenated cholesterol compounds produced in accordance with the Ziegler process, it is necessary to subject the halogenated sterol compounds to dehydrohalogenation with a suitable dehydrohalogenating agent. The compounds which have been most frequently employed to react with the halogenated sterol derivatives to effect dehydrohalogenation are organic compounds such as dimethylaniline, diethylaniline, collidine and quinoline. Compounds such as triethylamine, N,N-dipropylaniline, N-ethyl-piperidine and N,N-diethylcyclohexylamine have also been employed for this purpose. More recently U. S. Patents No. 2,546,-787 and No. 2,546,788 have disclosed the use of quinaldine for this purpose. The use of this compound has made possible the realization of increased yields of 7-dehydrocholesterol of greater purity than could be obtained prior to the use of quinaldine as a dehydrohalogenating agent. However, like others of the previously known dehydrohalogenating agents, quinaldine is not as readily available as is desirable and it is expensive to use because of its high initial cost. Also, quinaldine will deteriorate on standing since it is subject to air oxidation. In addition it is rather hygroscopic and precautions must be taken to keep it relatively free of moisture in order to obtain the best results.

Comparatively few attempts have been made by the prior art to use inorganic materials, such as the metal salts or metal hydroxides, or organo-metallic compounds, such as sodium acetate, as dehydrohalogenating agents. Those attempts which have been made have been relatively unsuccessful inasmuch as the yields realized were negligible and the products obtained were not of a high degree of purity. Dehydrohalogenation processes carried out using such agents have generally resulted in the decomposition of the halogenated sterol compound with attendant darkening of the reaction mixture and the evolution of hydrogen halide. For these reasons the principal efforts of the prior art have been directed towards the development of various organic reagents for use in effecting the dehydrohalogenation of halogenated sterol compounds.

It is the object of this invention to provide a new and valuable improvement in the process for producing 7-dehydrosterols.

It is a further object of this invention to provide a new and highly improved process for the dehydrohalogenation of halogenated sterol derivatives using a readily available and highly effective dehydrohalogenating agent.

Other objects of the invention will in part be obvious and will in part appear hereinafter.

It has been discovered in accordance with the present invention that the above and other objects can be achieved if the dehydrohalogenation of a halogenated sterol derivative is effected by reacting the halogenated sterol derivatives with an alkali metal or alkaline earth metal salt of alpha- or beta-alanine. In the preferred practice of the invention a 7-halogenocholesteryl ester is dehydrohalogenated by refluxing it with such a salt in an aromatic hydrocarbon solvent for a period of time sufficient to effect complete dehydrohalogenation.

Any alkali metal or alkaline earth metal salt of either alpha- or beta-alanine may be used for the dehydrohalogenation process. However, it is preferred to use either the sodium or the calcium salt of either alpha- or beta-alanine in the process of the invention. The amount of the alanate salt which is employed in the reaction should be sufficient, of course, to react completely with the halogenated sterol derivative which is to be dehydrohalogenated, i. e. at least equivalent quantities should be employed. As a matter of convenience it is usually preferred to use an excess of the alanate salt over the amount theoretically required to bring about the dehydrohalogenation reaction. Thus from about 2 to about 6 equivalent quantities of the alanate salt for each equivalent quantity of the halogenated sterol compound are conveniently employed. Larger amounts of the alanate salt may be employed if desired but the use of such larger amounts is not necessary.

In carrying out the process of the invention it is necessary to heat the mixture of the alanate salt and the halogenated sterol derivative with a suitable solvent. The solvents which are suitable for use in the practice of the invention are those which are inert to the reactants and which have a relatively high boiling point. While the most suitable solvents are those of the aromatic hydrocarbon type such as xylene, toluene and the other solvents listed in U. S. Patent No. 2,546,788, any solvent having the required properties can be employed.

In carrying out the process it is necessary to heat the reaction mixture in order to bring about the desired dehydrohalogenation. In general it is preferred to heat the reaction mixture at about the reflux temperature thereof although temperatures of from about 80° C. to about 150° C. can be employed. It is evident that the time of treatment may likewise be varied over a considerable range depending on the temperature at which the reaction is carried out. It is preferred to heat for a period of about 1½ hours when reflux temperature is maintained. The use of other temperatures will, of course, require corresponding adjustments in the period of heating.

At the completion of the dehydrohalogenation reaction, the dehydrohalogenated sterol derivative can be readily recovered by procedures normally used in the prior art processes. Thus the reaction mixture may be washed with an aqueous acid solution and with water to remove the excess alanate salt and the free alanine and the halogen salt formed by the dehydrohalogenation reaction. Thereafter the dehydrohalogenated sterol derivative can be recovered from the solvent solution by evaporation of the solvent or by crystallization from the solvent or from a mixture of the solvent solution with another solvent more adapted to crystallization of the desired dehydrohalogenated compound. These procedures will, of course, give the dhydrohalogenated sterol derivative. In many cases, such as with 7-dehydrosterol derivatives, it is desired to recover the free 7-dehydrosterol itself. Should the free 7-dehydrosterol compound itself be desired, it can be obtained from the 7-dehydrosterol derivative in any convenient manner. The exact method employed for isolating the free 7-dehydrosterol compound will dedepnd to some extent upon the specific derivative of the sterol employed as the starting material in the process. It is quite well known that a sterol compound prior to being subjected to halogenation in accordance with the Ziegler process must be treated in some manner or other so as to convert the hydroxyl group on the 3 position to a group which will not be detrimentally affected by the halogenating agent but which can conveniently be reconverted to a hydroxyl group. Thus the hydroxyl group may be converted to an ester group or to an ether group or it may be replaced with any other suitable inactive group which may later be split off with re-formation of the hydroxyl group at the 3 position. The most common practice in the prior art and what appears to be the most suitable and most feasible practice is to convert the hydroxyl group to an ester group by esterification with an efficient esterifying agent such as acetic anhydride, benzoyl chloride, or the like. If the sterol compound has been converted to an ester thereof, the sterol is re-formed by a simple hydrolysis of the ester group by saponification with alcoholic alkali. The usual practice in the prior art has been to remove the dhydrohalogenating agent from the reaction mixture by means such as described hereinabove prior to carrying out the saponification of the ester of the sterol compound.

Prior to recovering the sterol ester from the reaction mixture of our process, it is preferred to remove from the reaction mixture the excess alanate salt and the free alanine and the halogen salt formed by the dehydrohalogenation reaction. A highly satisfactory way to do this is to wash the solvent solution of the reaction mixture with an aqueous acid solution such as a 1 to 1 mixture of water and concentrated HCl using at least two such washings and then wash the solvent solution once with water. If desired, the excess alanate salt, the free alanine and the halogen salt may be removed from the reaction mixture merely by filtering the mixture since they are all insoluble in the aromatic hydrocarbon solvents which are the preferred reaction medium. After the excess alanate salt, the free alanine and the halogen salt are removed from the reaction mixture, it is preferred to admix the solvent solution of the sterol ester with a solvent which is readily adapted for crystallizing the sterol ester as, for example, acetone. The mixed solvent solution of the sterol ester is then cooled to a relatively low temperature, which will result in complete crystallization of the sterol ester. Thereafter the crystallized ester may be readily recovered in high purity by a simple filtration procedure. The ester is then hydrolyzed in the same fashion as in the prior art procedures in order to get the free 7-dehydrosterol. Any other suitable means of recovering free 7-dehydrosterol can, of course, be employed.

The yields of the desired 7-dehydrosterol derivatives which are obtained when the dehydrohalogenation is effected using an alkali metal or alkaline earth metal alanate salt as the dhydrohalogenating agent are substantially equal to those obtained when the dehydrohalogenation is carried out using the most effective of the previously known dehydrohalogenating agents. More importantly, the products which are obtained are generally of a relatively high degree of purity, e. g. 80% or better. In this respect it should be noted that the yields described in the prior art are misleading to a certain degree. For example, the hignest purities reported in the prior art for 7-dehydrocholesterol as produced in accordance with the prior art methods are from 57% to 67%. Experience has demonstrated that considerable losses are entailed in carrying out the purification of 7-dehydrocholesterol having such a relatively low degree of initial purity. In addition, estimates of purity at a 57–67% level are subject to considerable correction since the presence of extraneous materials absorbing in the ultra violet range makes accurate estimates of 7-dehydrocholesterol content difficult, if not impossible. Hence the ultimate yields of the purified product may be materially less than the reported yields of the 57–67% pure products should lead one to expect.

As mentioned above, it is common practice to block the hydroxyl group on the 3 position of the sterol compound during the halogenation reaction by converting the hydroxyl group to a group which will not react with the dehydrohalogenating agent but which may later be reconverted to the hydroxyl group. For convenience, the term "inactive group" will be used herein in referring to such a group. For the purposes of the present invention, it is entirely immaterial just what inactive group is used to protect the 3 position of the sterol compound since the reaction between the halogenated sterol compound and the alanate salt involves, of course, only the removal of the halogen atom from the 7 position on the sterol compound and the removal of the hydrogen atom from the 8 position of the sterol compound.

The specific examples given hereinafter show the use of the halogenated benzoate esters of chloesterol in the process of the invention. These examples are only illustrative and the reaction which takes place between these halogenated esters and the alanate salts takes place with equal efficiency and ease between the alanate salts and any other sterol compound having a double bond between the 5 and 6 carbon atoms and a halogen atom on the 7 carbon atoms. Thus the process of our invention is quite suitable for and is very effective in dehydrohalogenating any sterol compounds of this nature regardless of whether they are the esters, the ethers or any other suitable derivatives of the particular sterol compound being dehydrohalogenated. Furthermore, as far as the esters are concerned, any of the various sterol esters which may be formed can be dehydrohalogenated by the process of our invention. Among the sterol esters which have been utilized in the prior art patents and which are quite suitable for use in the process of our invention there may be mentioned the formate, the acetate, the oxalate, the propionate, the butyrate, the benzoate, and the stearate esters of the halogenated sterol compounds.

For a fuller understanding of the nature and objects of the invention, reference may be had to the following examples which are given merely as further illustrations of the invention and are not to be construed in a limiting sense.

*Example I*

A mixture of 125 ml. of xylene and 25 grams of calcium beta-alanate was refluxed with stirring using a Dean-Stark trap to remove traces of water. Sufficient xylene was added to the solution to bring it to the original volume. The solution was then heated to reflux and while refluxing there were added to the solution 25 grams of crude 7-bromocholesterylbenzoate having a purity of 75.0%. The mixture was refluxed with vigorous stirring for one and one-quarter hours. It was then cooled to 40° C. and thereafter washed successively with 35 ml. of a 1 to 1 mixture of water and concentrated HCl, 25 ml. of a 1 to 1 mixture of water and concentrated HCl and then with tepid water to neutrality. Thereafter the solvent solution was admixed with 800 ml. of acetone and stored overnight at −15° C. The 7-dehydrocholesterylbenzoate which crystallized from the solution was removed by filtration. A yield of 13.6 grams was obtained. A spectrographic analysis showed that the product had a purity of 81%, all points on the spectrographic curve falling in line with the desired product. Therefore, the net yield was 68% of theory.

Example II

The process of Example I was repeated except that 50 grams of calcium beta-alanate were employed instead of 25 grams as in Example I. Also all the reactants were mixed together at room temperature instead of adding the calcium beta-alanate to the refluxing solution. In addition the reaction mixture was refluxed for one and one-half hours instead of one and one-quarter hours. A yield of 12.5 grams of 7-dehydrocholesterylbenzoate having a purity of 83.2% was obtained.

From the above illustrative examples and the general description of the invention given herein, it is readily apparent that the present invention provides an excellent process for the dehydrohalogenation of halogenated sterol compounds and one which can be successfully carried out using a highly satisfactory and readily available dehydrohalogenating agent. Although the detailed examples given hereinabove have dealt with the treatment of esters of cholesterol, the process of our invention can be applied to the treatment of any esters of any similar sterol or to any other sterol derivative in which the 3 position is protected by some inactive group on the 3 position other than an ester group such as, for example, an ether group. The particular inactive group which is at the 3 position to protect that position from attack throughout the process of converting the sterol to a 7-dehydrosterol is entirely unimportant as far as the process of our invention is concerned inasmuch as the particular group which is on the 3 position in no way enters into the reaction which occurs between the halogenated sterol compound and the alanate salt. Consequently the process of our invention is applicable to the dehydrohalogenation of any sterol derivative having an inactive group on the 3 position and having a double bond between the 5 and 6 carbon atoms and a halogen atom on the 7 carbon atom. As pointed out hereinabove, the free alanine formed during the reaction and the excess alanate salt can be readily recovered from the reaction mixture. The free alanine can, of course, be converted to any of the desired alanate salts. Thus there is little or no loss of the dehydrohalogenating agent and it can be used repeatedly. Thus our process is highly economical.

Having described our invention, what we claim as new and desire to secure by Letters Patent is:

1. In a process for producing a 7-dehydrosterol, the step which comprises reacting an alanate salt selected from the group consisting of alkali metal and alkaline earth metal salts of alpha-alanine and beta-alanine with a sterol derivative selected from the group consisting of sterol esters and sterol ethers which have a double bond between the 5 carbon atom and the 6 carbon atom and which have a halogen atom attached to the 7 carbon atom, the reaction being carried out by heating the alanate salt and the halogenated sterol compound in an inert solvent at a temperature of not less than about 80° C.

2. The process of claim 1 wherein the inert solvent is an aromatic hydrocarbon solvent.

3. In a process for producing a 7-dehydrosterol, the step which comprises reacting an alanate salt selected from the group consisting of alkali metal and alkaline earth metal salts of alpha-alanine and beta-alanine with a sterol ester which has a double bond between the 5 carbon atom and the 6 carbon atom and which has a halogen atom attached to the 7 carbon atom, the reaction being carried out by heating the alanate salt and the sterol ester in an aromatic hydrocarbon solvent at a temperature of not less than about 80° C.

4. The process of claim 3 wherein the sterol ester is an ester of cholesterol.

5. The process of claim 3 wherein the sterol ester is 7-bromocholesteryl benzoate.

6. In a process for producing 7-dehydrocholesterol, the step which comprises reacting an alanate salt selected from the group consisting of alkali metal and alkaline earth metal salts of alpha-alanine and beta-alanine with 7-bromocholesteryl benzoate, the reaction being carried out by heating the alanate salt and the 7-bromocholesteryl benzoate in an aromatic hydrocarbon solvent at the reflux temperature of the reaction mixture.

7. The process of claim 6 wherein the hydrocarbon solvent is xylene.

8. The process of claim 6 wherein the alanate salt is a calcium salt.

9. The process of claim 8 wherein the hydrocarbon solvent is xylene.

10. The process of claim 6 wherein the alanate salt is a sodium salt.

11. The process of claim 10 wherein the hydrocarbon solvent is xylene.

12. In a process for producing 7-dehydrocholesterol, the step which comprises reacting calcium beta-alanate with 7-bromocholesteryl benzoate, the reaction being carried out by heating the calcium beta-alanate and the 7-bromocholesteryl benzoate in xylene at the reflux temperature of the reaction mixture.

References Cited in the file of this patent

UNITED STATES PATENTS

| | | |
|---|---|---|
| 2,441,091 | Vliet | May 4, 1948 |
| 2,546,788 | Schaaf | Mar. 27, 1951 |
| 2,694,726 | Anspon | Nov. 16, 1954 |

FOREIGN PATENTS

| | | |
|---|---|---|
| 474,246 | Canada | June 5, 1951 |